(12) United States Patent
Walker et al.

(10) Patent No.: US 6,707,572 B1
(45) Date of Patent: Mar. 16, 2004

(54) FILTERING METHOD TO REDUCE PIXEL DENSITY

(75) Inventors: James R. Walker, Maineville, OH (US); Alfonso J. Marmora, Jr., Mason, OH (US); Robert D. Cheek, Fairfield, OH (US)

(73) Assignee: Tesseron, Ltd., Loveland, OH (US)

( * ) Notice: Subject to any disclaimer, the term of this patent is extended or adjusted under 35 U.S.C. 154(b) by 0 days.

(21) Appl. No.: 09/135,735

(22) Filed: Aug. 18, 1998

Related U.S. Application Data

(60) Provisional application No. 60/058,763, filed on Sep. 12, 1997.

(51) Int. Cl.⁷ .............................. G06F 15/00; G06K 1/00
(52) U.S. Cl. ..................... 358/1.9; 358/1.5; 358/502; 358/3.06; 358/3.1; 358/3.2; 358/3.3; 358/3.13; 358/3.19
(58) Field of Search .................. 358/1.9, 1.5, 502, 358/3.06, 3.1, 3.2, 3.3, 3.13, 3.19

(56) References Cited

U.S. PATENT DOCUMENTS

| | | | | |
|---|---|---|---|---|
| 4,722,008 A | * | 1/1988 | Ibaraki et al. ............... | 382/192 |
| 5,313,287 A | * | 5/1994 | Barton ........................ | 358/458 |
| 5,557,709 A | * | 9/1996 | Shu ............................ | 358/1.9 |
| 5,574,832 A | * | 11/1996 | Towery et al. ............... | 358/1.9 |
| 5,625,756 A | * | 4/1997 | Campbell ..................... | 358/1.9 |
| 5,646,742 A | | 7/1997 | Clark et al. .................. | 358/298 |
| 5,661,824 A | * | 8/1997 | Allebach et al. ............. | 345/428 |
| 5,686,998 A | | 11/1997 | Clark et al. .................. | 358/296 |
| 5,689,623 A | * | 11/1997 | Pinard ......................... | 358/1.9 |
| 5,706,046 A | * | 1/1998 | Eki et al. ..................... | 347/252 |
| 5,757,970 A | * | 5/1998 | Callahan et al. ............. | 382/236 |
| 5,850,294 A | * | 12/1998 | Apostolopoulos et al. ...................... | 358/426.14 |
| 5,892,852 A | * | 4/1999 | Namizuka et al. .......... | 358/3.14 |
| 5,959,656 A | * | 9/1999 | Dhong et al. ................ | 358/1.9 |
| 6,099,104 A | * | 8/2000 | Sato et al. .................... | 347/15 |
| 6,285,795 B1 | * | 9/2001 | Cho ............................ | 382/243 |

FOREIGN PATENT DOCUMENTS

| | | | |
|---|---|---|---|
| EP | 0 580 376 A1 | 1/1994 | |
| EP | 0 582 433 A1 | 2/1994 | |
| EP | 0 625 765 A1 | 11/1994 | |
| JP | 0935216 A2 | * 8/1999 | ............. G06T/5/00 |

OTHER PUBLICATIONS

Rafael C. Gonzalez and Richard E. Woods, *Digital Image Processing*, 1993, pp. 189–201.
Preliminary Search Report dated Apr. 18, 2002, French Application No. 98 11363.

* cited by examiner

*Primary Examiner*—Edward Coles
*Assistant Examiner*—Ashanti Ghee
(74) *Attorney, Agent, or Firm*—Taft, Stettinius & Hollister LLP

(57) ABSTRACT

A computerized method for controlling the density of pixels deposited by a print engine includes the steps of: (a) obtaining a two-dimensional pixel map of an image to be printed; (b) comparing a value of a first pixel element in the pixel map with values of pixel elements adjacent to the first pixel element in the pixel map; (c) changing the value of the first pixel element responsive to a determination, in the comparing step, that a predetermined number of pixel elements adjacent to the first pixel element have the same value as the first pixel element; and (d) dispatching the pixel map to a print engine. The comparing step (b) includes the steps of assigning like-value pixel elements immediately adjacent to the first pixel element a first weight, assigning like-value pixel elements diagonally adjacent to the first pixel element a second weight, different than the first weight, adding the assigned weights together to produce a total weight, and testing the weight against a predetermined threshold. The changing step includes the step of changing the value of the first pixel element if the total weight is equal to or greater than the predetermined threshold. Alternatively, the changing step is performed if all pixel elements immediately adjacent to the first pixel element have the same value of the first pixel element.

11 Claims, 4 Drawing Sheets

FILTERING METHOD TO REDUCE PIXEL DENSITY

CROSS-REFERENCE TO RELATED APPLICATION(S)

The present application claims priority under 35 U.S.C. §119 from U.S. Provisional Patent Application Ser. No. 60/058,763, filed Sep. 12, 1997; the disclosure of which is incorporated herein by reference.

BACKGROUND OF THE INVENTION

The present invention relates to raster printer controllers for controlling print engines, and more particularly, to a computerized method operable on a raster printer controller for reducing pixel density in high pixel density areas of bitmaps before dispatching such bitmaps to the print engines.

Certain printing engines or marking engines utilize a non-impact printing technology known as magnetography. In magnetography a revolving metal drum is selectively magnetized by an array of small electromagnets to create a latent magnetic image on the drum. The drum is then exposed to magnetic toner particles which are retained by the magnetized image areas of the drum. The image is then transferred onto a substrate such as paper and subsequently fused thereto. Commercially available marking engines utilizing the magnetographic technology include the Nipson M700 and 7000 Series printers. A more detailed description of the magnetography process can be found in Nipson's web page, "http://www.nipson.com/magnetog.htm"

Single color (i.e., black and white) versions of such magnetographic printers receive bitmaps from printer controllers, and in turn, transfer the bitmaps to the paper utilizing the magnetographic process described above. Such bitmaps are generally two-dimensional arrays of binary digits, corresponding to two-dimensional arrays of pixels to be transferred to the printed page. A positive valued binary digit ("1") in the bitmap corresponds to a solid-colored pixel in the printed image while a null valued binary digit ("0") in the bitmap corresponds to a blank or clear pixel in the printed image.

One known problem with the magnetographic process is that the intensity of the magnetic domains that are created on the imaging drum is non-linear. Extremely dense areas in the image (areas in the image having a multitude of packed-together solid-color pixels) will often cause the magnetic toner to bleed over into surrounding, less dense, areas. Narrow bands of blank pixels surrounded by the dense areas of solid-color pixels are particularly sensitive to this bleed over effect.

Accordingly, there is a need for a means to reduce the density of solid-color pixels in high-density solid-color areas within a bitmap, prior to printing the image represented by the bitmap, to compensate for the non-linear behavior of the magnetographic marking engine.

DEFINITIONS

For the purposes of this disclosure, the following terms are defined as follows:

Pixel Map: a two-dimensional arrangement of elements, corresponding to a two-dimensional arrangement of pixels making up a printed image. Of course, a bitmap is an example of a pixel map.

Positive Valued Pixel Element: an element of a pixel map corresponding to a solid-colored pixel in the printed image. Typically represented by a binary "1" in a bitmap.

Null Valued Pixel Element: an element of a pixel map corresponding to a blank or clear pixel in the printed image. Typically represented by as a binary "0" in a bitmap.

SUMMARY OF THE INVENTION

The present invention provides a computerized method which compensates for the non-linear behavior of the magnetographic marking engines by reducing the density of solid-color pixels in high-density solid-color areas within an image. The method may be performed by the printer controller or by the marking engine itself, resulting in improved image quality. Preferably, the computerized method also preserves the less dense portions of the image.

In one embodiment of the present invention, a computerized method for controlling the density of pixels deposited by print a engine includes the steps of: (a) obtaining a two-dimensional pixel map of an image to be printed; (b) selecting a first positive valued pixel element in the pixel map; (c) changing the first pixel element to a null value if a predetermined number of pixel elements in the pixel map immediately adjacent to the first pixel element have a positive value; and (d) dispatching the pixel map to the print engine.

In a preferred embodiment of this method, the predetermined number of pixel elements in the pixel map immediately adjacent to the first pixel element having a positive value must equal four (corresponding to all of the immediately adjacent pixel elements). Preferably this method is performed for each pixel element in the pixel map prior to dispatching the pixel map to the print engine. Furthermore, in various embodiments of the present invention, borders of high density pixel areas need not be subjected to the above test.

In another embodiment of the present invention a computerized method for controlling the density of pixels deposited by a print engine includes the steps of: (a) obtaining a two-dimensional pixel map of an image to be printed; (b) selecting a first positive valued pixel element in the pixel map; (c) assigning positive value pixel elements in the pixel map immediately adjacent to the first pixel element a first weight; (d) assigning positive valued pixel elements in the pixel map diagonally adjacent to the first pixel element a second weight; (e) adding the assigned first and second weights together to produce a total weight; (f) changing the first pixel element to a null value if the total weight is equal to or greater than a predetermined threshold; and (g) dispatching the pixel map to the print engine. In a preferred embodiment, the weight to be applied to immediately adjacent positive pixel elements equals "5," the weight applied to diagonally adjacent positive pixel elements equals "1," and the threshold value equals either "16" or "17."

Accordingly, it is an object of the present invention to provide a computerized method for reducing the density of positive valued pixels in high density areas prior to transmitting the pixel map to the marking engine. It is a further object of the present invention to preserve less dense portions of the image.

It is a further object of the present invention to provide a computerized method for controlling the density of pixels deposited by a print engine that comprises the steps of: (a) obtaining a two-dimensional pixel map of an image to be printed; (b) comparing the value of a first pixel element in the pixel map with values of pixel elements adjacent to the first pixel element in the pixel map; (c) changing the value of the first pixel element responsive to a determination, in the comparing step, that a predetermined number of the pixel elements adjacent to the first pixel element have the same value as the first pixel element; and (d) dispatching the pixel map to the print engine.

It is a further object of the present invention that the above changing step be performed responsive to a determination, in the comparing step, that all pixel elements immediately adjacent to the first pixel element have the same value as the first pixel element.

It is a further object of the present invention that the comparing step includes the steps of assigning pixel elements immediately adjacent to the first pixel element and having the same value as the first pixel element a first weight, assigning pixel elements diagonally adjacent to the first pixel element and having the same value as the first pixel element a second weight different than the first weight, adding the weights for the immediately adjacent and diagonally adjacent pixel elements to produce a total weight, and testing the total weight against a predetermined threshold; and where the changing steps include the step of changing the value of the first pixel element responsive to a determination, in the comparing step, that the total weight is equal to or greater than the predetermined threshold.

It is also an object of the present invention to provide a software program, stored on a memory device, configured to control a printer controller or a marking engine to perform the steps of: (a) obtaining a two-dimensional pixel map of an image to be printed; (b) preparing a value of a first pixel element in the pixel map with values of pixel elements adjacent to the first pixel element in the pixel map; and (c) changing the value of the first pixel element responsive to a determination, in the comparing step, that a predetermined number of pixel elements adjacent to the first pixel element have the same value as a first pixel element.

These and other objects and advantages of the present invention will be apparent from the following description, the attached drawings, and the appended claims.

DETAILED DESCRIPTION OF THE INVENTION

Figure 1:
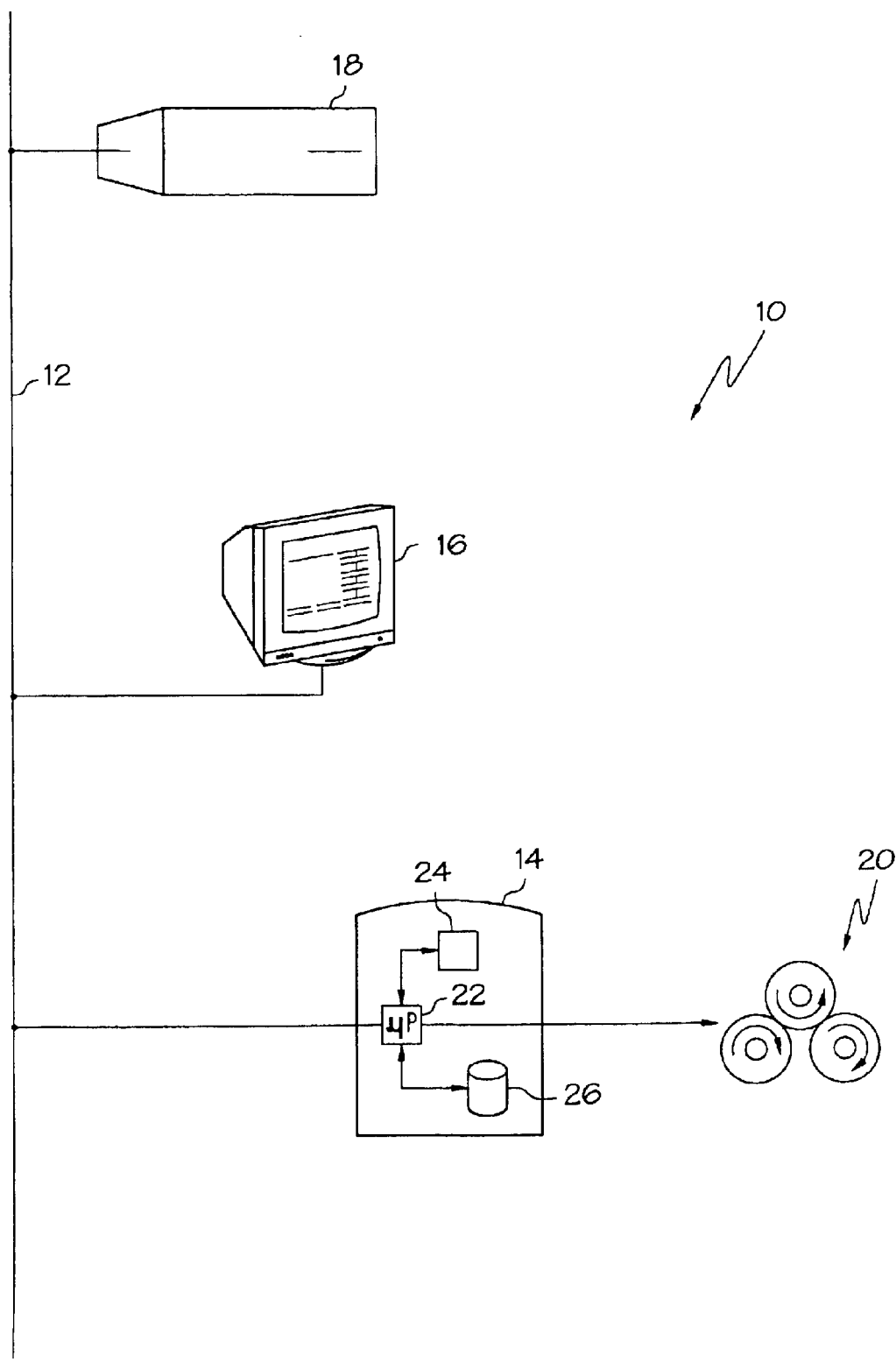
FIG. 1 is a block diagram representation of a computer controlled printing system incorporating the present invention.

As shown in FIG. 1, an embodiment of a computer controlled printing system 10 incorporating the method and system of the present invention includes a network line, such as an ETHERNET line 12, a high speed printer controller 14 coupled to the ETHERNET line 12, an operator display terminal 16 coupled to the ETHERNET line 12, and at least one host or peripheral computer 18 coupled to the ETHERNET line. The printer controller 14 is configured to receive page description language ("PDL") files from the network. (e.g., transmitted from one of the computers 18) and converts the PDL files into bitmaps that are transmitted to one or more print engines 20. The operator display terminal 16 preferably used a touch screen graphical user interface for allowing a person to control or monitor the operations of the printer controller 14. For detailed description of a high-speed printer controller and printing system for use with the present invention, see U.S. Pat. Nos. 5,594,860, 5,729,665 and 5,740,338.

The printer controller 14 includes a processor 22 operatively coupled to a random access memory ("RAM") 24. The operations of the controller 14 are controlled according to a computer program resident within the RAM 24. The processor 22 is also operatively coupled to a non-volatile memory 26 as is known to those of ordinary skill in the art. The non-volatile memory 26 may store a version of the program so that it can be downloaded into the RAM 24 upon booting up the controller 14. For the purposes of the present invention, software embodying the computerized method of the present invention (described below) may be resident within a computer such as the printer controller 14, or alternatively, resident within a memory device such as the RAM 24 or non-volatile memory 26. Such a memory device may also take the form of any read-only memory ("ROM") as is known to those of ordinary skill in the art. Examples of suitable ROM devices include CD ROM's, hard disks, floppy disks, EEPROM devices, flash memory devices, tapes and the like.

Figure 2:
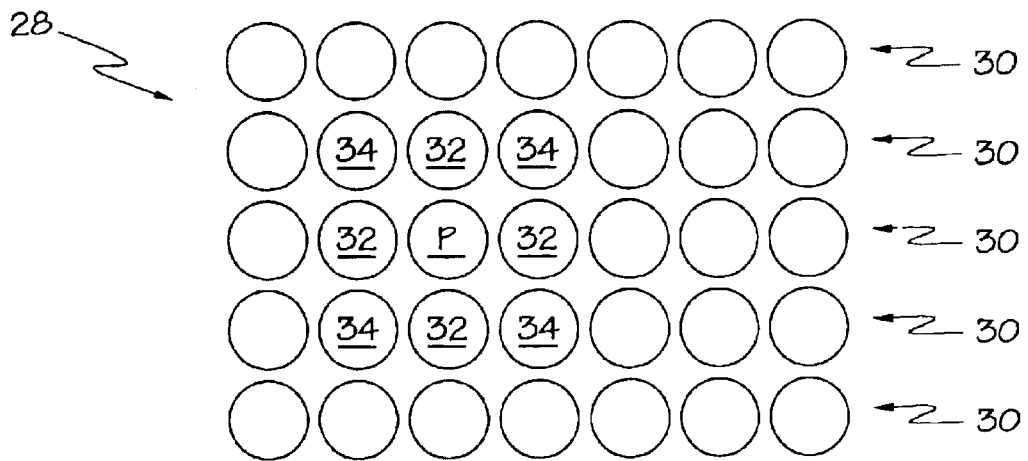
FIG. 2 is a representative illustration of a pixel map.

As shown in FIG. 2, a two-dimensional pixel map representation 28 of an image is generally a two-dimensional array of pixel elements. The pixel maps transferred to the printed page are typically arranged in a plurality of scan lines 30, which are rows of the pixel elements. For the purposes of this disclosure, each pixel element P in a pixel map includes four immediately adjacent pixel elements 32, and also includes four diagonally adjacent pixel elements 34.

Figure 3:
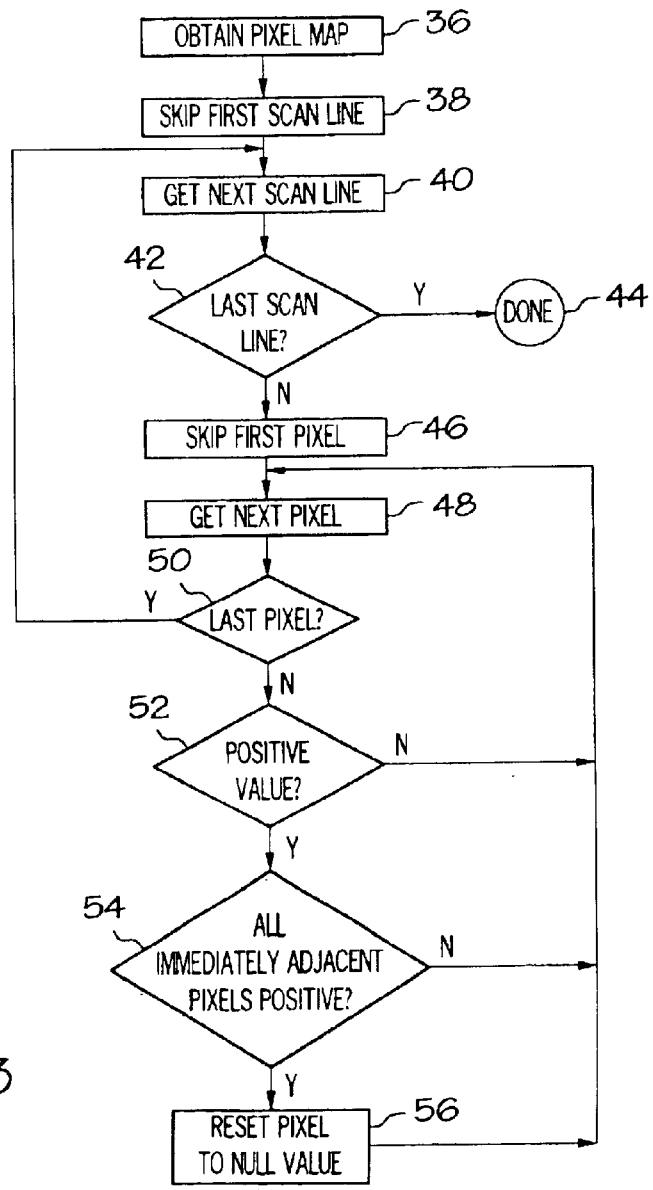
FIG. 3 is a flow diagram representation of a method of the present invention.

Referring FIG. 3, a first method for reducing the density of solid-colored areas (i.e., areas in a pixel map having a multitude of positive-valued pixel elements in close proximity to each other) within an image to compensate for the non-linear behavior of a marking engine is provided. A software program resident in RAM 24 of the printer controller 14 will be configured to control the printer controller 14 to perform the following steps: First, as shown in functional block 36, a pixel map of an image is obtained. Because, in this particular embodiment, pixel elements on the borders of the pixel map will never be reset since at least one immediately adjacent pixel element will always have a null value, in functional block 38, the first scan line of the pixel map is skipped. Advancing the functional block 40, the next scan line is retrieved from the pixel map. In functional block 42, the program determines whether or not the scan line retrieved from the pixel map is the last scan line, and if so, the method will be finished and the program will advance to functional block 44. If, in functional block 42, the program determines that the present scan line is not the last scan line in the pixel map, the program will advance to functional block 46. In functional block 46, the program will skip the first pixel element of the scan line, since the first pixel element in a scan line will be a border pixel element. Advancing to functional block 48, the program will obtain the next pixel element in the scan line. In functional block 50, the program will determine whether the present pixel element is the last pixel element in the scan line; and if so, will return to functional block 40 to retrieve the next scan line. If, in functional block 50 the program determines that the present pixel element is not the last pixel element in the scan line, the program will advance to functional block 52. In functional block 52, the program will test whether or not the present pixel element is a positive valued pixel element. If the present pixel element is not a positive valued pixel element, the program returns to functional block 48 to get the next pixel element in the scan line. However, if the present pixel element is a positive valued pixel element, the program advances to functional block 54. In functional block 54, the program will determine whether or not all of the immediately adjacent pixel elements are positive valued pixel elements. If not, the program returns to functional block 48 to get the next pixel in the scan line. However, if in functional block 54, the program determines that all of the immediately adjacent pixel elements are positive valued pixel element, then the program advances to functional block 56 to reset the present pixel element to a null valued pixel element. From functional block 56, the program returns to functional block 48 to retrieve the next pixel element in the scan line.

Accordingly, the program will retrieve one scan line at a time, skipping the top and bottom scan lines, and will test each of the pixel elements on the scan lines, skipping the end pixel elements, to determine whether or not to reset the pixel element from a positive valued pixel element (representing a solid colored pixel in the printed image) to a null valued pixel element (representing a blank or clear pixel in the printed image).

The following is an example of the operation of the first method described above. The notation for the example is as follows: "[A,B]" represents a pixel A on scan line B, and "X" represents a positive valued pixel element in the pixel map, and an "O" represents a null valued pixel element in the pixel map.

Given five scan lines of pixel elements which are mostly positive valued pixel elements except for a small strip of null valued pixel elements near the upper right side of the pixel map, represented as follows:

| 0 | 1 | 2 | 3 | 4 | 5 | 6 | 7 | 8 | 9 |
|---|---|---|---|---|---|---|---|---|---|
| 1 | X | X | X | X | X | X | O | X | X |
| 2 | X | X | X | X | X | O | O | O | X |
| 3 | X | X | X | X | X | O | O | O | X |
| 4 | X | X | X | X | X | O | O | O | X |
| 5 | X | X | X | X | X | X | O | X | X | according to the above described method, for each pixel element, examine the immediately adjacent pixel elements, and if all four immediately adjacent pixel elements are positive valued, then reset the current pixel element to be a negative valued pixel element. According to the above method, the first and last scan lines are skipped, the first and last pixel elements in each scan line are skipped, and any null valued pixel element is skipped. Processing the second pixel element in the second scan line, positive valued pixel element [2,2], examine the immediately adjacent pixel elements [2,1], [3,2], [2,3], and [1,2]. Because all of the immediately adjacent pixel elements are positive valued, pixel element [2, 2] is then reset to a null valued pixel element. The following table represents the appearance of the example pixel map after the above steps:

| 0 | 1 | 2 | 3 | 4 | 5 | 6 | 7 | 8 | 9 |
|---|---|---|---|---|---|---|---|---|---|
| 1 | X | X | X | X | X | X | O | X | X |
| 2 | X | O | X | X | X | O | O | O | X |
| 3 | X | X | X | X | X | O | O | O | X |
| 4 | X | X | X | X | X | O | O | O | X |
| 5 | X | X | X | X | X | X | O | X | X |

Next, processing pixel element [3,2], the immediately adjacent pixels are [3,1], [4,2], [2,2] and [3,3]. Because immediately adjacent pixel element [2,2] is now a null valued pixel element, the present positive valued pixel element [3,2] is left unchanged. Accordingly, the pixel map after this step remains as follows:

| 0 | 1 | 2 | 3 | 4 | 5 | 6 | 7 | 8 | 9 |
|---|---|---|---|---|---|---|---|---|---|
| 1 | X | X | X | X | X | X | O | X | X |
| 2 | X | O | X | X | X | O | O | O | X |
| 3 | X | X | X | X | X | O | O | O | X |
| 4 | X | X | X | X | X | O | O | O | X |
| 5 | X | X | X | X | X | X | O | X | X |

Next, processing pixel element [4,2], the immediately adjacent pixel elements are [4,1], [5,2], [4,3], and [3,2]. Because all of these pixel immediately adjacent pixel elements are presently positive valued pixel elements, the present pixel element [4,2] is reset to a null valued pixel element. This results in the following appearance of the pixel map:

| 0 | 1 | 2 | 3 | 4 | 5 | 6 | 7 | 8 | 9 |
|---|---|---|---|---|---|---|---|---|---|
| 1 | X | X | X | X | X | X | O | X | X |
| 2 | X | O | X | O | X | O | O | O | X |
| 3 | X | X | X | X | X | O | O | O | X |
| 4 | X | X | X | X | X | O | O | O | X |
| 5 | X | X | X | X | X | X | O | X | X |

This process continues for all pixel elements on scan lines 2–5, except for the first and last pixel elements. At the end of this process, as shown in the following resultant pixel map, only pixel elements [2,2], [4,2], [3,3], [2,4] and [4,4] have been reset to a null element:

| 0 | 1 | 2 | 3 | 4 | 5 | 6 | 7 | 8 | 9 |
|---|---|---|---|---|---|---|---|---|---|
| 1 | X | X | X | X | X | X | O | X | X |
| 2 | X | O | X | O | X | O | O | O | X |
| 3 | X | X | O | X | X | O | O | O | X |
| 4 | X | O | X | O | X | O | O | O | X |
| 5 | X | X | X | X | X | X | O | X | X |

Figure 4:
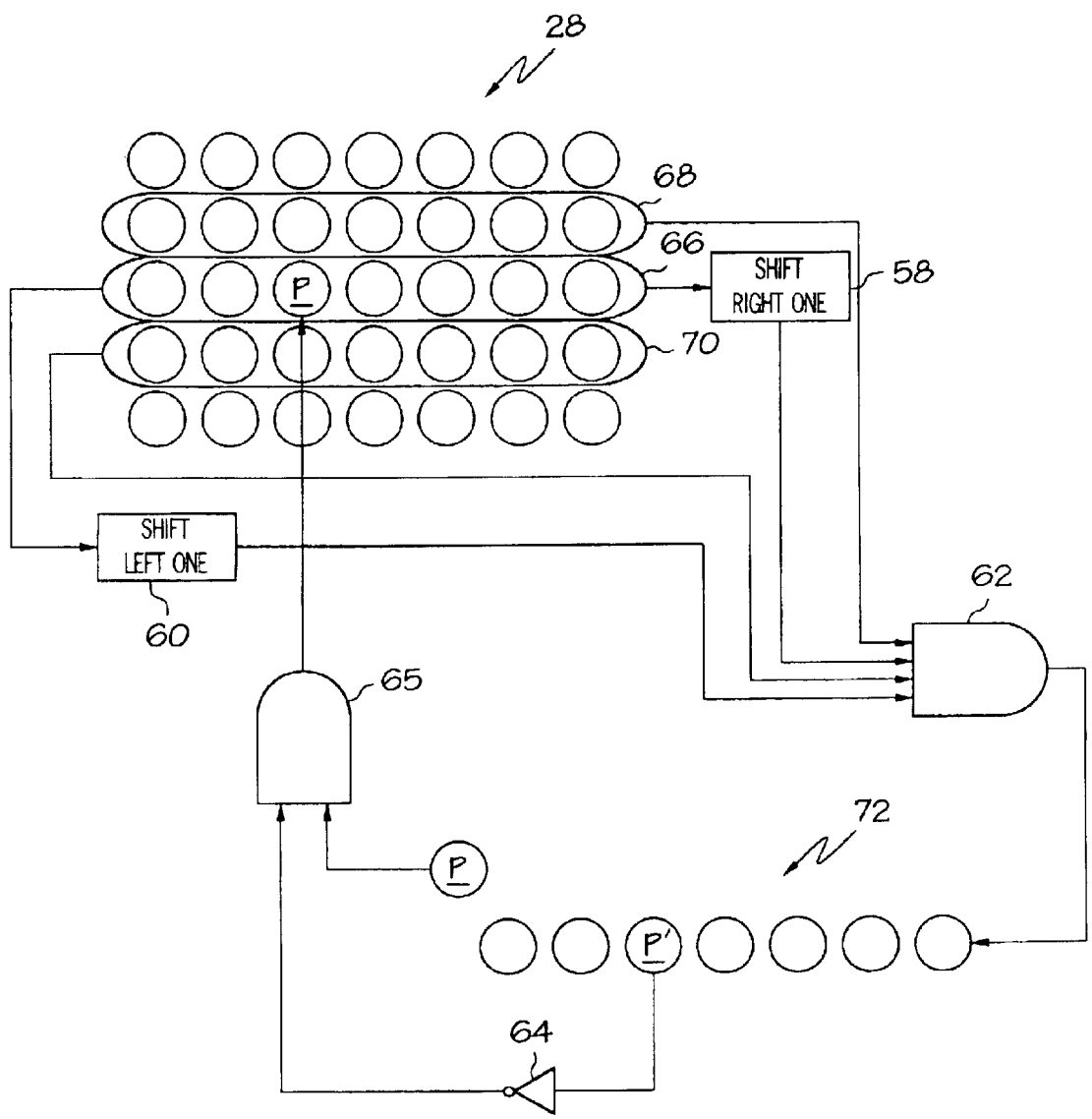
FIG. 4 is a schematic flow diagram representation of a method of the present invention.

As shown in FIG. 4, if the pixel map 28 is a bitmap having binary digits of "1" corresponding to solid-colored pixels and binary digits of "0" corresponding to blank pixels, a version of the first method described above can be implemented in hardware or software utilizing a shift-right register or step 58, a shift-left register or step 60, a logical AND device or step 62, a logical NOT device or step 64, and a logical AND device or step 65. The shift-right register or step 58 and the shift-left register or step 60 are adapted to receive a scan line from the pixel map and respectively shift the scan line one digit right or left.

To process a particular pixel element P in the pixel map 28 using to the hardware or software scheme illustrated in FIG. 4 the following steps are performed: First, the scan line 66 containing the present pixel element P is sent through the shift-right register or step 58, the result of which is sent to the AND device or step 62; the present scan line 56 is also sent through the shift-left register or step 60, the result of which is sent to the AND device or step 62; the previous scan line 68 is sent to the AND device or step 62; and the subsequent scan line 70 is also sent to the AND device or step 62. The logical AND device 62 will produce a resultant scan line 72. Next, the pixel element P' in the resultant scan line 72, corresponding to the position of the present pixel element P in the present scan line 68 is sent through the NOT device or step 64, the output of which is sent to the a input of the AND device or step 65. The other input to the AND device or step 65 is the present pixel element P. Finally, the result of the AND device or step 65 is then inserted in place of the present pixel element P in the pixel map 28.

Figure 5:
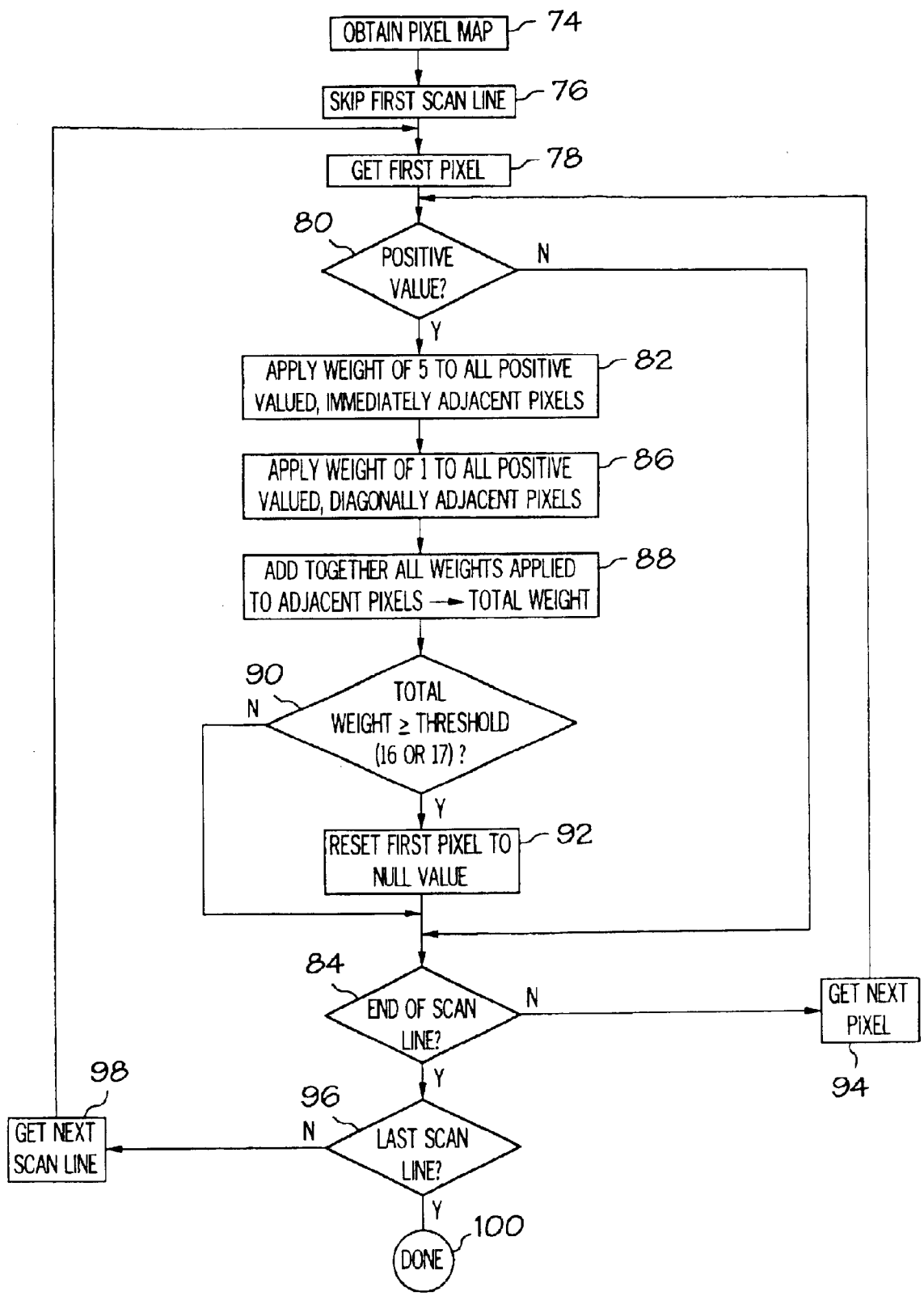
FIG. 5 is a flow diagram representation of another method of the present invention.

Referring FIG. 5, a second method for reducing the density of solid-colored areas (i.e., areas in a pixel map having a multitude of positive-valued pixel elements in close proximity to each other) within an image to compensate for the non-linear behavior of a marking engine is provided. A software program resident in RAM 24 of the printer controller 14 will be configured to control the printer controller 14 to perform the following steps: First, in functional block 74, the program will obtain the pixel map. Advancing to functional block 76, the program will access the first scan line from the pixel map. Advancing to functional block 78, the program will access the first pixel element in the scan line. Advancing to functional block 80, the program will determine whether the present pixel element is a positive valued pixel element. If the present pixel element is a positive valued pixel element, the program will advance to functional block 82 and if the present pixel element is a null valued pixel element, the program will advance to functional block 84. In functional block 82, the program will apply a weight value of "5" to all positive valued pixel elements that are immediately adjacent to the present pixel element. Advancing to functional block 86, the program will apply a weight value of "1" to all positive valued pixel elements diagonally adjacent to the present pixel element. Advancing to functional block 88, the program will add together all of the weights applied to the immediately adjacent and diagonally adjacent pixel elements from steps 82 and 86 to determine the total weight. Advancing to functional block 90, the program will compare the total weight computed in functional block 88 against a threshold value. If the total weight is greater or equal to the threshold value the program will advance to functional block 92; but if the total weight is not greater or equal to the threshold value the program will advance to functional block 84. It has been found that threshold values of 16 or 17 appear to work well with the Nipson 700 print engine. However those of ordinary skill in the art will be able to experiment with other threshold values to determine which threshold value works best for the particular application. In functional block 92, because the total weight calculated in functional block 88 is greater or equal to the threshold, the program will reset the present pixel element to a null valued pixel element and then advance to functional block 84. In functional block 84, the program will determine whether or not the present pixel element is at the end of the scan line. If not the program will advance to functional block 94 to obtain the next pixel element of the scan line and then will return to functional block 80. If, in functional block 84, the program determines that the present pixel element is at the end of the scan line, then the program will advance to functional block 96 to determine whether or not the present scan line is the last scan line. If the present scan line is not the last scan line then the program will advance to functional line 98 to get the next scan line in the pixel map, and from functional block 98 the program will return to functional block 78. If, in functional block 96, the program determines that the present scan line is the last scan line in the pixel map, then the method is completed and the program will advance to functional block 100. Note that in this second method, the first and last scan lines, as well as the first and last pixel elements in each scan line, are not skipped.

The following is an example of the second method described in FIG. 5 performed on the same pixel map of the previous example, which is as follows:

| 0 | 1 | 2 | 3 | 4 | 5 | 6 | 7 | 8 | 9 |
|---|---|---|---|---|---|---|---|---|---|
| 1 | X | X | X | X | X | X | ○ | X | X |
| 2 | X | X | X | X | X | ○ | ○ | ○ | X |
| 3 | X | X | X | X | X | ○ | ○ | ○ | X |
| 4 | X | X | X | X | X | ○ | ○ | ○ | X |
| 5 | X | X | X | X | X | X | ○ | X | X |

In the present example, the threshold value is set at 16. Processing element [1,1], weights are applied and summed as shown in the following table:

| Pixel Element | Value | Weight | Weighted Value |
|---|---|---|---|
| [1,0] | Null | 5 | 0 |
| [2,0] | Null | 1 | 0 |
| [2,1] | Positive | 5 | 5 |
| [2,2] | Positive | 1 | 1 |
| [1,2] | Positive | 5 | 5 |
| [0,2] | Null | 1 | 0 |
| [0,1] | Null | 5 | 0 |
| [0,0] | Null | 1 | 0 |
| | | Weighted sum: | 11 |

Using a threshold value of 16 would result in this pixel element remaining a positive valued pixel element. Processing the next pixel element in the scan line, pixel element [2,1], the weights are applied and summed as shown in the following table:

| Pixel Element | Value | Weight | Weighted Value |
|---|---|---|---|
| [2,0] | Null | 5 | 0 |
| [3,0] | Null | 1 | 0 |
| [3,1] | Positive | 5 | 5 |
| [3,2] | Positive | 1 | 1 |
| [2,2] | Positive | 5 | 5 |
| [1,2] | Positive | 1 | 1 |
| [1,1] | Positive | 5 | 5 |
| [1,0] | Null | 1 | 0 |
| | | Weighted sum: | 17 |

Using a threshold value of 16 would result in this pixel element being reset to a null pixel element, which results in the following pixel map at this point:

| 0 | 1 | 2 | 3 | 4 | 5 | 6 | 7 | 8 | 9 |
|---|---|---|---|---|---|---|---|---|---|
| 1 | X | ○ | X | X | X | X | ○ | X | X |
| 2 | X | X | X | X | X | ○ | ○ | ○ | X |
| 3 | X | X | X | X | X | ○ | ○ | ○ | X |
| 4 | X | X | X | X | X | ○ | ○ | ○ | X |
| 5 | X | X | X | X | X | X | ○ | X | X |

Processing the remaining pixel elements in the first scan line, one by one, in the same manner results in the following pixel map:

| 0 | 1 | 2 | 3 | 4 | 5 | 6 | 7 | 8 | 9 |
|---|---|---|---|---|---|---|---|---|---|
| 1 | X | ○ | X | ○ | X | X | ○ | X | X |
| 2 | X | X | X | X | X | ○ | ○ | ○ | X |
| 3 | X | X | X | X | X | ○ | ○ | ○ | X |
| 4 | X | X | X | X | X | ○ | ○ | ○ | X |
| 5 | X | X | X | X | X | X | ○ | X | X |

And finally, processing the remaining scan lines, one by one, in the same manner as the first scan line, results in the following pixel map:

| 0 | 1 | 2 | 3 | 4 | 5 | 6 | 7 | 8 | 9 |
|---|---|---|---|---|---|---|---|---|---|
| 1 | X | ○ | X | ○ | X | X | ○ | X | X |
| 2 | ○ | X | ○ | X | ○ | ○ | ○ | ○ | X |
| 3 | X | ○ | X | ○ | X | ○ | ○ | ○ | X |
| 4 | ○ | X | ○ | X | ○ | ○ | ○ | ○ | X |
| 5 | X | X | X | X | X | X | ○ | X | X |

It is to be understood that modifications may be made to any of the above embodiments without departing from the scope of the present invention as defined by the following claims. For example, in any of the above methods, it is within the scope of the present invention process every $2^{nd}$, $3^{rd}$ or $4^{th}$ pixel element in the scan line, rather than processing every pixel on a scan line. Likewise it is within the scope of the present invention to process every $2^{nd}$, $3^{rd}$ or $4^{th}$ scan line as well.

What is claimed is:

1. A computerized method for controlling the density of pixels deposited by a print engine comprising the steps of:
   obtaining a two-dimensional pixel map of an image to be printed;
   comparing a value of a first pixel element in the pixel map with values of pixel elements adjacent to the first pixel element in the pixel map;
   changing the value of the first pixel element responsive to a determination, in the comparing step, that a predetermined number of pixel elements adjacent to the first pixel element have the same value as the first pixel element; and
   dispatching the pixel map to a print engine;
   wherein the changing step is performed responsive to a determination, in the comparing step, that all pixel elements immediately adjacent to the first pixel element have the same value as the first pixel element.

2. The computerized method of claim 1, wherein the value of the first pixel element is a positive value and the changing step changes the value of the first pixel element to a null value.

3. The computerized method of claim 2, wherein the positive value corresponds to a colored pixel being deposited by the print engine and wherein the null value corresponds to no pixel being deposited by the print engine.

4. A computerized method for controlling the density of pixels deposited by a print engine comprising the steps of:
   obtaining a two-dimensional pixel map of an image to be printed;
   comparing a value of a first pixel element in the pixel map with values of pixel elements adjacent to the first pixel element in the pixel map;
   changing the value of the first pixel element responsive to a determination, in the comparing step, that a predetermined number of pixel elements adjacent to the first pixel element have the same value as the first pixel element; and
   dispatching the pixel map to a print engine;
   wherein the comparing step includes the steps of assigning pixel elements immediately adjacent to the first pixel element and having the same value as the first pixel element a first weight, assigning pixel elements diagonally adjacent to the first pixel element and having the same value as the first pixel element a second weight different that the first weight, adding the weights for the immediately adjacent and diagonally adjacent pixel elements to produce a total weight, and testing the total weight against a predetermined threshold; and
   wherein the changing step includes the step of changing the value of the first pixel element responsive to a determination, in the comparing step, that the total weight is equal to or greater than the predetermined threshold.

5. The computerized method of claim 4, wherein the first weight is approximately five times the second weight.

6. A computerized method for controlling the density of pixels deposited by a print engine comprising the steps of:
   obtaining a two-dimensional pixel may of an image to be printed, the pixel map having a plurality of scan lines;
   selecting a first pixel element in the pixel map, the first pixel element residing at a first position in a first scan line;
   performing a logical AND operation on a second scan line immediately preceding the first scan line, a third scan line immediately following the first scan line, a fourth scan line which is the first scan line shifted left one digit, and a fifth scan line which is the first scan line shifted right one digit, to produce a resultant scan line;
   resetting the first pixel element in he pixel map if a pixel element at the first position in the resultant scan line has a positive value; and
   dispatching the pixel map to a print engine.

7. A computerized method for controlling the density of pixels deposited by a print engine comprising the steps of:
   obtaining a two-dimensional pixel map of an image to be printed;
   selecting a first positive valued pixel element in the pixel map;
   changing the first pixel element to a null value if a predetermined number of pixel elements in the pixel map immediately adjacent to the first pixel element have a positive value; and
   dispatching the pixel map to a print engine;
   wherein the predetermined number is four.

8. A computerized method for controlling the density of pixels deposited by a print engine comprising the steps of:
   obtaining a two-dimensional pixel map of an image to be printed;
   selecting a first positive valued pixel element in the pixel map;
   assigning positive valued pixel elements in the pixel map immediately adjacent to the first pixel element a first weight;

assigning positive valued pixel elements in the pixel map diagonally adjacent to the first pixel element a second weight;

adding the assigned first and second weights together to produce a total weight;

changing the first pixel element to a null value if the total weight is equal to or greater than a predetermined threshold; and dispatching the pixel map to a print engine.

9. The computerized method of claim 8, wherein the first weight is larger than the second weight.

10. The computerized method of claim 9, wherein the first weight is five times the second weight.

11. The computerized method of claim 10, wherein the first weight is 5, the second weight is 1 and the predetermined threshold is in the range of 16 to 19.

* * * * *

UNITED STATES PATENT AND TRADEMARK OFFICE
CERTIFICATE OF CORRECTION

PATENT NO. : 6,707,572 B1
DATED : March 16, 2004
INVENTOR(S) : Walker et al.

It is certified that error appears in the above-identified patent and that said Letters Patent is hereby corrected as shown below:

Column 10,
Line 27, between the words "pixel" and "of", delete the word "may" and insert the word -- map -- to read "pixel map of".

Signed and Sealed this

Tenth Day of May, 2005

JON W. DUDAS
*Director of the United States Patent and Trademark Office*